United States Patent [19]

Ahrweiler

[11] Patent Number: 4,578,847

[45] Date of Patent: Apr. 1, 1986

[54] ROLL

[75] Inventor: Karl-Heinz Ahrweiler, Krefeld, Fed. Rep. of Germany

[73] Assignee: Eduard Küsters, Krefeld-Forstwald, Fed. Rep. of Germany

[21] Appl. No.: 392,670

[22] Filed: Jun. 28, 1982

[30] Foreign Application Priority Data

Aug. 27, 1981 [DE] Fed. Rep. of Germany ....... 3133815

[51] Int. Cl.⁴ .............................................. B21B 13/02
[52] U.S. Cl. ............................ 29/113 AD; 29/116 AD
[58] Field of Search ...... 29/116 AD, 113 AD, 116 R, 29/113 R; 100/162 B; 277/DIG. 8

[56] References Cited

U.S. PATENT DOCUMENTS

| 3,196,520 | 7/1965 | Appenzeller | 29/116 AD |
| 3,362,055 | 1/1968 | Bryce | 29/113 AD |

FOREIGN PATENT DOCUMENTS

| 405835 | 2/1965 | Japan | 29/116 AD |
| 555193 | 7/1975 | U.S.S.R. | 29/116 AD |

Primary Examiner—Mark Rosenbaum
Assistant Examiner—Timothy V. Eley
Attorney, Agent, or Firm—Kenyon & Kenyon

[57] ABSTRACT

A roll has a rotating roll shell and a stationary beam extending longitudinally through the shell and leaving an annular space between it and the inner periphery of the shell. A longitudinal chamber having a supply pipe for pressure fluid is formed in the space between the shell and beam and is divided by a sealing system comprising transverse end seals and strip-like longitudinal seals extending on both sides of the plane of action of the roll. Each longitudinal seal is formed by a number of sealing strips staggered in the peripheral direction. A line opens between each pair of sealing strips and contains a one-way valve and leads into an outlet. The one-way valves are set to open at pressures which progressively decrease towards the longitudinal chamber. The transverse longitudinal seals can also be made up of a number of sealing strips staggered in the radial direction.

6 Claims, 5 Drawing Figures

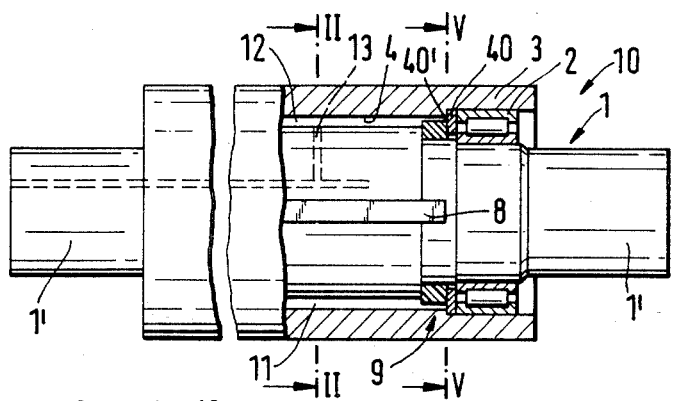
FIG. 1
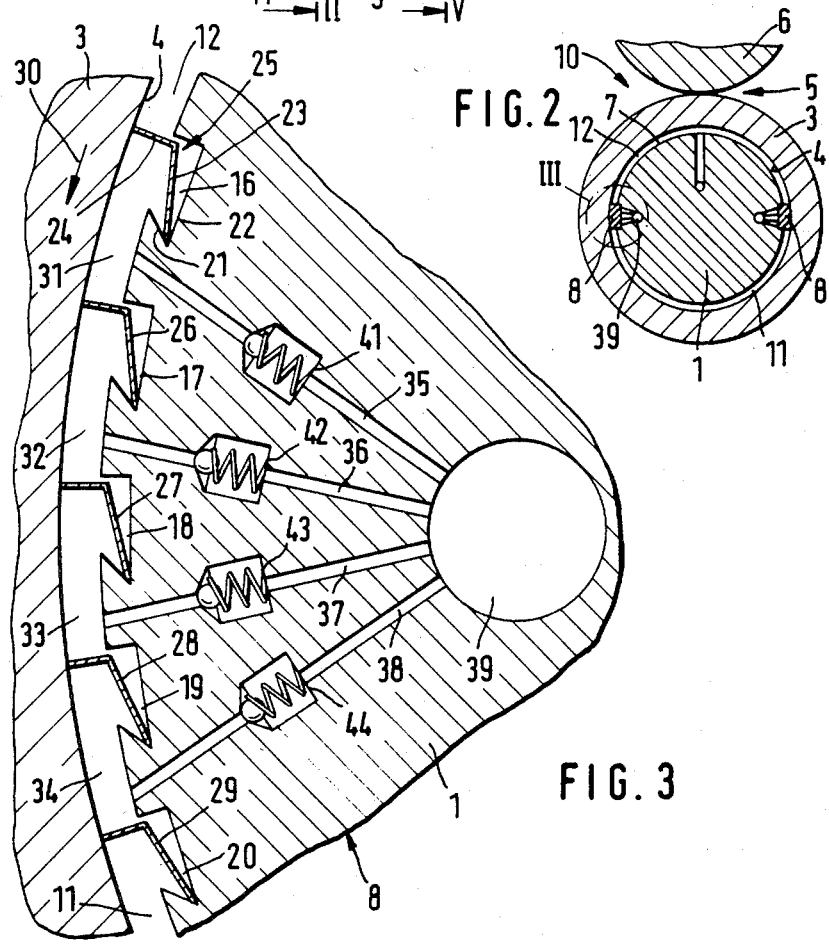
FIG. 2
FIG. 3

ROLL

BACKGROUND OF THE INVENTION

This invention relates to rolls in general and more particularly to an improved roll of the type referred to as a "floating roll".

A floating roll is a roll comprising a rotating shell forming the working roll periphery and a fixed beam extending longitudinally through the shell and leaving an annular space between it and the shell periphery, the ends of the beam projecting from the shell and being adapted to receive external forces and the shell bearing on the beam via a pressure fluid in a longitudinal chamber having a supply pipe and formed in the space between the shell and beam, the chamber being divided by a sealing system mounted on the beam and comprising strip-like longitudinal seals extending along the beam and shell on both sides of the operating plane of the roll and transverse end seals disposed on the opposite ends of the chamber. Rolls of this kind, with various embodiments of the longitudinal and transverse end seals, are described in German Patent Specification Nos. 11 93 739, 20 25 777 and 27 18 414.

In German PS No. 11 93 739, the longitudinal seals are strips having a substantially L-shaped cross-section, the short arm of the "L" bearing against the inner surface of the roll shell and the long arm of the "L" engaging and bearing in a groove, undercut at one side, in the beam. The pressure acts from the "outside" of the "L" on the sealing strip and tilts it around the bearing point at the free end of the long arm, thus pressing it against the inner periphery of the roll shell. German patent specification Nos. 20 25 777 and 27 18 414 disclose longitudinal seals disposed in radial grooves extending along the beam and pressed against the beam by the pressure in the chamber formed between the beam and the inner periphery of the shell. During operation, in all embodiments, the inner periphery of the shell slides along the longitudinal seals, during which time the sealing strips are pressed against the sliding surface (i.e. the inner periphery) by a force proportional to the pressure in the chamber.

Years of experience have shown that these rolls operate in a satisfactory manner as long as the pressure in the chamber is below about 25 bar. This pressure is quite sufficient for the use of the aforementioned rolls in the paper, textile and plastics industries.

If however the pressure in the chamber is raised about 25 bar, the friction between the seals and the coacting surfaces increases to such an extent that considerable power is lost and there is a rapid increase in wear. This is particularly serious because rolls are continuously operating components and replacement of a roll is very expensive and often involves closing down an entire production line.

If however rolls of the kind in question are used for processing metals, higher specific pressures are necessary and result in higher pressures in the chamber.

Admittedly it is known in principle from "Melliand Textilberichte" 8/53 (1972), pages 935–940 to use "floating rolls" as described above in the steel industry. In practice, however, additional special constructions are required for this purpose, owing to the higher pressures.

SUMMARY OF THE INVENTION

According to the present invention, in a roll comprising a rotating shell forming the working roll periphery and a fixed beam extending longitudinally through the shell and leaving an annular space between it and the shell periphery, the ends of the beam projecting from the shell and being adapted to receive external forces and the shell bearing on the beam via a pressure fluid in a longitudinal chamber having a supply pipe and formed in the space between the shell and beam, the chamber being divided by a sealing system mounted on the beam and comprising strip-like longitudinal seals extending along the beam and shell on both sides of the operating plane of the roll and transverse end seals disposed at the opposite ends of the chamber, one seal comprises a number of parallel sealing strips staggered in the sealing direction, defining between each pair of neighboring sealing strips a sealing chamber fillable with pressure fluid and each sealing strip is acted on by the pressure in the preceding chamber on the side of the longitudinal chamber and pressed against the coacting surface.

Preferably each sealing strip is also acted on by a relieving pressure which prevails in the following chamber, is equal to part of the pressure in the preceding chamber, and tends to raise the sealing strip from the coacting surface.

The purpose of these features is to prevent the entire pressure in the longitudinal chamber from acting on one sealing strip only, which will as a result be urged under high pressure against the inner periphery of the shell, but to divide the total pressure and thus ensure that each sealing strip in the staggered arrangement is subjected to only a part of the total pressure in the longitudinal chamber sufficient to keep the strip in question in the "safe" pressure region, the strip being pressed by only a limited pressure against the co-acting surface. To this end, in preferred embodiments each sealing strip is acted upon by a relief pressure in the sealing chamber formed between each pair of adjacent strips, the relief pressure also being used to load the next strip in the staggered arrangement. In this manner the total pressure can be reduced in harmless stages along the staggered arrangement of sealing strips in the peripheral direction. The "sealing direction" is the transverse direction relative to the sealing strips, in which the pressure fluid would try to escape if there was no seal. The "co-acting surface" is the surface which slides past each seal and against which the seal bears the sealingly tight manner.

Advantageously when the seal is the longitudinal seal the sealing strips are staggered in the peripheral direction and abut the inner periphery of the roll shell.

Preferably when the seal is the transverse end seal, the sealing strips are bent in a circle and radially staggered and abut a radial surface connected to the roll shell.

Conveniently the space between each pair of neighboring sealing strips communicates with a line containing a one-way valve which opens only when a predetermined pressure is reached, and the opening pressures of the one-way valves decreasing progressively in a direction away from the longitudinal chamber.

If, in such a case, a pressure is built up in the longitudinal chamber by introducing pressure fluid, a small amount of pressure fluid inevitably leaks at the sealing strip immediately adjacent the longitudinal chamber.

The leaking fluid reaches the sealing chamber between the first strip and the adjacent next strip and fills the latter chamber through the line before the pressure has reached the set level at which the one-way valve in question opens. The opening pressure is a fixed amount below the pressure in the longitudinal chamber and relieves the pressure on the first sealing strip, which is therefore at an operative pressure only equal to the difference between the pressure in the longitudinal chamber and the pressure in the first sealing chamber. The difference is equal to the excess of the pressure in the longitudinal chamber over the set opening pressure of the first one-way valve.

Of course leakages also occur at the second sealing strip, the leaking fluid escaping into the second sealing chamber, formed between the second and third sealing strip, and building up a pressure there after a certain running-in time. The second chamber likewise has a line and a one-way valve, which is set to open at a lower pressure than the first one-way valve. In practice, therefore, the second strip is subjected to the difference between the pressure in the first and in the second sealing chamber.

The number of successive staggered sealing strips will depend on the pressure level and the limits to the endurance of the material used for the sealing strips.

Pressure in the sealing chambers can also be built up by pressure fluid introduced separately through special lines. The invention is thus not restricted to overflowing leaking fluid.

BRIEF DESCRIPTION OF THE DRAWINGS

FIG. 1 is an elevation view of a roll according to the present invention, partly in longitudinal section.

FIG. 2 is a cross-section along line II—II in FIG. 1.

FIG. 3 is a detail from the circle III in FIG. 2 on a larger scale.

DETAILED DESCRIPTION

Figure 4:
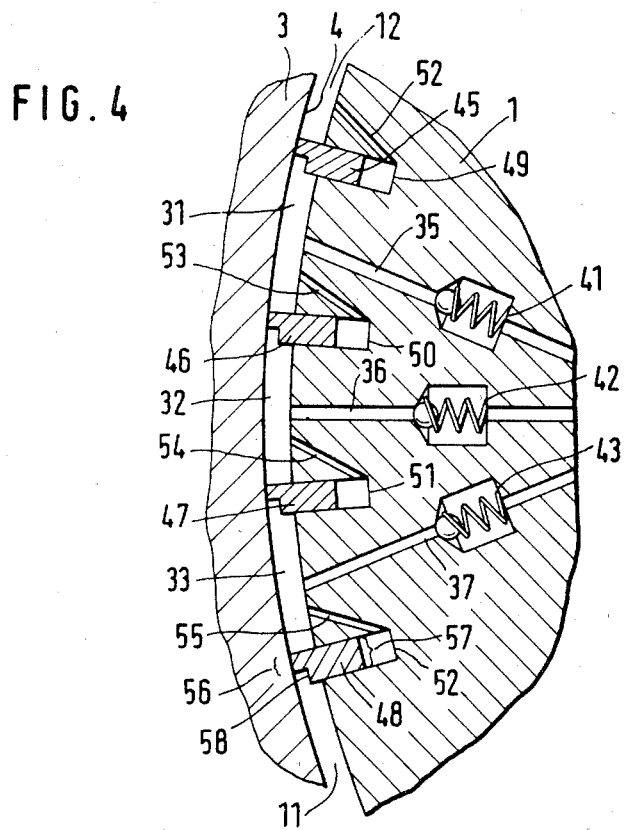
FIG. 4 is a corresponding view of another embodiment of the present invention.

FIG. 1 shows a roll 10 comprising a stationary beam 1 and a roll shell 3 surrounding the beam, the inner periphery of the shell being at a distance on all sides from the outer periphery of beam 1 and bearing on beam 1 via bearings 2 near the ends. The ends 1' of beam 1 project from shell 3 and form tunnions, through which forces can be applied on roll 10 or which can be mounted on a roll stand. In the illustrated embodiment, a co-acting roll 6 bears from above against roll 10 and forms a nip 5 on the top side thereof. (See FIG. 2.)

A chamber formed between the inner periphery 4 of shell 3 and beam 1 between bearings 2 is divided by longitudinal seals 8, disposed at both sides of beam 1 approximately half way up it, i.e. at the widest part, and abutting the inner periphery 4, and by transverse end seals 9 disposed adjacent the inside of bearings 2 into a substantially sealed longitudinal chamber 12 disposed on the same side as nip 5 and a substantially sealed chamber 11 remote from nip 5. As illustrated in FIG. 2, each longitudinal seal 8 subtends only a small angle so that the major part of the space between the beam 1 and shell 3 is taken up by the chambers 11 and 12. In other words, each seal 8 occupies a space which is small compared to the circumference of the roll. Similarly, seals 9 at the ends occupies a space small as compared to the length of the roll. A supply pipe 13 leads into chamber 12 and can supply it with pressure fluid. The pressure fluid bears both against the inner periphery 4 of shell 3 and against the facing surface 8 of beam 1. Since there is an annular space between beam 1 and the inner periphery of shell 3, the beam can sag under the pressure in chamber 12 required for producing the line pressure, without affecting the shell 3. The shell 3 may also be deliberately deflected, since it bears via bearings 2 on beam 1.

When the shell 3 rotates, some fluid always leaks through the longitudinal seals 8 into the bottom chamber 11, so that it gradually fills with pressure fluid. It may sometimes be desirable deliberately to fill chamber 11 with pressure fluid at a pressure which is in a given proportion to the pressure in chamber 12. Lines are required for this purpose but, for simplicity, are not shown.

FIG. 3 is a detailed view of the left longitudinal seal 8 in FIG. 2, which is shown only diagrammatically in FIGS. 1 and 2. Of course, the right longitudinal seal 8 is similarly constructed. In the illustrated embodiment, beam 1 in the neighborhood of longitudinal seal 8 has five pocket-like longitudinal recesses 16, 17, 18, 19 and 20 whose sides 21 remote from chamber 12 are undercut so that each side 21 is at an acute angle to the base 22 of each groove. The apex of the acute angle receives the longer arm 23 of a sealing strip whose short arm 24, as shown in FIG. 3, bears against the inner periphery of shell 3, which rotates in the direction of arrow 30. The pressure in the longitudinal chamber 12 is applied against the "outside" of sealing strip 25, i.e. against the top side of arm 24 in FIG. 3, and against the right side of arm 23.

The next groove 17 and the corresponding sealing strip 26 follow strip 25 in the direction of arrow 30 as closely as is allowed by the construction. Other sealing strips 27, 28 and 29 are adjacent. A sealing chamber 31 is formed between strips 25 and 26, a sealing chamber 32 between strips 26 and 27, a sealing chamber 33 between strips 27 and 28, and a sealing chamber 34 between strips 28 and 29. Longitudinal chamber 11 is adjacent strip 29.

Chambers 31, 32, 33 and 34 are connected by lines 35, 36, 37 and 38 to an outlet 39 in beam 1. One-way valves, non-return ball valves 41, 42, 43 and 44 are disposed in lines 35, 36, 37 and 38 and are set to open at pressures which decrease stepwise with their distance from chamber 12. If, for example, the forces to be applied to roll 10 make it necessary to operate chamber 12 at a pressure of 125 bars, valves 41, 42, 43 and 44 can be set to open at pressures of 100, 75, 50 and 25 bars respectively.

If roll 10 is put into operation and the pressure builds up in chamber 12, a given proportion of the pressure fluid flows under the bearing surface of arm 24 into chamber 31, where it builds up a pressure. The pressure acts against the "inside" of strip 25 and tries to lift it from the inner periphery 4 of shell 3. Consequently the pressure in chamber 31 relieves the pressure on strip 25. Since the pressure fluid in chamber 31 also acts against the "outside" of strip 26, it relieves the pressure thereon.

If the pressure in chamber 31 rises above the opening pressure of valve 41, the excess pressure fluid will be discharged through line 35 into outlet 39. Consequently, the effective pressure on strip 25 cannot become greater than the difference between the pressure in chamber 12 and the pressure for opening valve 41. It is thus possible to limit the stress on strip 25, although it is directly exposed to the high pressure in chamber 12.

The pressure in chamber 32 relieves the pressure in chamber 31 acting on strip 26. Thus the effective pressure on strip 26 is only the difference between the pressures in chambers 31 and 32. The same applies to all the subsequent strips 27, 28, 29. Often strip 29 will not have any relieving pressure unless a special pressure is maintained in chamber 11. Seal 29 is therefore exposed to the full pressure in chamber 34, but this can be limited by one-way valve 44 to a value acceptable for strip 29.

FIG. 4 shows an alternative embodiment containing only four sealing strips 45, 46, 47 and 48. Parts in FIG. 4 similar to FIG. 3 bear similar reference numbers.

Strips 45, 46, 47 and 48 have a substantially rectangular cross-section, and are disposed and are radially movable in radial slots 49, 50, 51 and 52 of beam 1. A sealing chamber 31 is formed between strips 45 and 46, a chamber 32 is formed between strips 46 and 47 and a chamber 33 between strips 47 and 48. The space at the bottom of the groove below each sealing strip is connected by a duct to the chamber at the next higher pressure. For example, the space under strip 45 is connected by duct 52 to chamber 12, the space under strip 46 is connected by duct 53 to chamber 31, the space under strip 47 is connected by duct 54 to chamber 32 and the space under strip 48 is connected by duct 55 to chamber 33. In this manner each strip is pressed against the inner periphery 4 of shell 3 by a force corresponding to the adjacent pressure.

As before, lines 35, 36 and 37 open into sealing chambers 31, 32 and 33 between the individual sealing strips and have one-way valves 41, 42 and 43 opening at progressively decreasing pressures. Fluid leaking through strip 45 fills chamber 31 until the pressure is at the opening pressure of valve 41. The pressure in chamber 31 acts on sealing strip 46 via duct 53. The fluid leaking through strip 46 enters chamber 32, and so on.

The longitudinal seals 45, 46, 47 and 48 in FIG. 4 are diagrammatically represented by a shaded rectangle having a recess in its cross-section on the side facing the inner periphery 4 of roll 3. As a result, as shown in the case of longitudinal seal 48, the bearing region 56 at the inner periphery 4 of shell 3 is narrower than the width 57 of groove 52 or the surface acted upon by the pressure in groove 52. Consequently the pressure on surface 58 of seal 48 counteracts the pressure in groove 52, i.e. it relieves the pressure. Correspondingly, seal 45 is pressed by the pressure in chamber 12 and relieved by the pressure in chamber 31, seal 46 is pressed by the pressure in chamber 31 and relieved by the pressure in chamber 32 and seal 47 is pressed by the pressure in chamber 32 and relieved by the pressure in chamber 33.

Longitudinal seals 45, 46, 47 and 48 are only diagrammatically indicated and details of their construction can vary, provided the pressures of the chambers or sealing chambers consecutively in the direction away from longitudinal chamber 12 are higher from the back and lower from the opposite side.

The seal having the construction shown in FIGS. 1 to 4 is mainly of use for the longitudinal seal 8, but is also basically suitable for the transverse end seal 9. Seal 9 is shown only diagrammatically in FIG. 1. The individual sealing strips are radially staggered and act against the radial surface, facing seal 9, of a ring 40 rotating with and sealed against shell 3.

Figure 5:
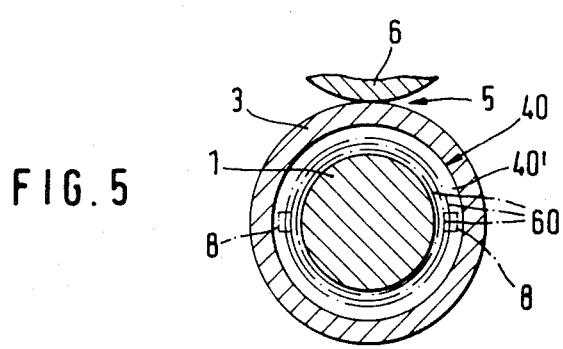
FIG. 5 is a cross-section along line V—V in FIG. 1.

FIG. 5 is a diagrammatic section showing dash-dotted lines 60 at which three radially staggered sealing strips bear against ring 40. In the embodiment, lines 60 extends in a circle round the entire periphery, but in some cases it may be sufficient if the bent sealing strips forming seal 9 extend only in a half-circle in the neighborhood of chamber 12 up to seals 8.

What is claimed is:

1. In a roll comprising a rotating shell forming the working roll periphery and a fixed beam extending longitudinally through the shell and leaving an annular space between it and the shell periphery, the ends of the beam projecting from the shell and being adapted to receive external forces and the shell bearing on the beam via a pressure fluid in a longitudinal chamber having a supply pipe and formed in the annular space between the shell and beam, said annular space being divided into only two semi-annular, sealed chambers, one of which comprises said longitudinal chamber, by a sealing system mounted on the beam and consisting of first and second strip-like longitudinal seals extending along the beam and shell on opposite sides of the operating plane of the roll and transverse end seals disposed at opposite ends of the chamber, each seal occupying a space which is small compared to the circumference of said roll and length of said roll, respectively, said seals adapted to inhibit flow of the pressure fluid past said seals to the other chamber, whereby the pressure on one side of said sealing system will be approximately zero and that on the other side the full pressure of said pressure fluid, the improvement comprising at least one of the seals comprising a number of closely spaced parallel sealing strips staggered in the sealing direction, defining between each pair of neighboring sealing strips a sealing chamber fillable with pressure fluid, each sealing strip acted on by pressure in the preceding chamber on the side of the longitudinal chamber such as to press it against the coacting surface; and means causing each sealing strip also to be acted on by a relieving pressure which prevails in the following chamber, and tends to raise the sealing strip from the coacting surface, so that each strip is acted on by pressure from both sides, the differential pressure on each strip being only a fraction of the total pressure differential between the full pressure fluid pressure and zero.

2. A roll according to claim 1, wherein the seal is the longitudinal seal and the sealing strips are staggered in the peripheral direction and abut the inner periphery of the roll shell.

3. A roll according to claim 1, wherein the seal is the transverse end seal and the sealing strips are bent in a circle and radially staggered and abut a radial surface connected to the roll shell.

4. A roll according to claim 1, wherein the space between each pair of neighboring sealing strips communicates with a line containing a one-way valve which opens only when a predetermined pressure is reached, and the opening pressures of the one-way valves decrease progressively in a direction away from the longitudinal chamber.

5. A roll according to claim 2 wherein each sealing strip has an angular cross-section with a short arm bearing against the inner periphery of said shell and a long arm retained in a recess in said beam.

6. A roll according to claim 2 wherein each strip comprises a strip of longitudinal cross-section radially movably disposed in a radial slot in said beam.

* * * * *